United States Patent
Qiu et al.

(10) Patent No.: US 10,748,019 B2
(45) Date of Patent: Aug. 18, 2020

(54) IMAGE PROCESSING METHOD AND ELECTRONIC APPARATUS FOR FOREGROUND IMAGE EXTRACTION

(71) Applicant: REALTEK SEMICONDUCTOR CORP., Hsinchu (TW)

(72) Inventors: Zhong-Yi Qiu, Taichung (TW); Wen-Tsung Huang, Chiayi (TW); Kai Liu, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 184 days.

(21) Appl. No.: 16/108,430

(22) Filed: Aug. 22, 2018

(65) Prior Publication Data

US 2019/0147280 A1 May 16, 2019

(30) Foreign Application Priority Data

Nov. 15, 2017 (TW) .............................. 106139501 A (51) Int. Cl.
*G06K 9/20* (2006.01)
*H04N 9/75* (2006.01)
(Continued)

(52) U.S. Cl.
CPC ....... *G06K 9/2027* (2013.01); *G06K 9/00268* (2013.01); *G06K 9/2018* (2013.01);
(Continued)

(58) Field of Classification Search
CPC . G06T 7/11; G06T 7/174; G06T 7/194; G06T 2207/10048; G06T 2207/10152;
(Continued)

(56) References Cited

U.S. PATENT DOCUMENTS 8,983,151 B2 * 3/2015 Park ..................... G06K 9/2027
382/118
9,008,457 B2 * 4/2015 Dikmen .................. G06T 5/008
382/274
(Continued)

FOREIGN PATENT DOCUMENTS

| CN | 102760234 A | 10/2012 |
| CN | 107408205 A | 11/2017 |
| TW | 201711449 A | 3/2017 |

OTHER PUBLICATIONS

Han, et al. (Fusion of color and infrared video for moving human detection), pp. 1771-1784. (Year: 2007).*
(Continued)

*Primary Examiner* — Daniel G Mariam
(74) *Attorney, Agent, or Firm* — Li & Cai Intellectual Property (USA) Office (57) ABSTRACT

An image processing method and an electronic apparatus for foreground image extraction include steps: (A) acquiring frame images of a dynamic image, wherein each frame image has an RGB image and an IR image; (B) acquiring an RGB image representing a dark state as an RGB capture image, acquiring an IR image representing a light state as an IR light frame image, and acquiring one IR image representing the dark state as an IR dark frame image; (C) calculating a difference image between the IR light frame image and the IR dark frame image and binarizing the difference image to generate a binarized image; and (D) acquiring a plurality of foreground pixels corresponding to an IR foreground part of the binarized image of the RGB capture image and taking the foreground pixels as the foreground image, thereby reducing the impact of ambient light, background noise and calculation.

17 Claims, 6 Drawing Sheets

(51) Int. Cl.
    *G06K 9/46*     (2006.01)
    *G06K 9/00*     (2006.01)
    *G06K 9/38*     (2006.01)
    *G06T 7/174*     (2017.01)
    *G06T 7/11*     (2017.01)
    *G06T 7/194*     (2017.01)

(52) U.S. Cl.
    CPC ............. *G06K 9/38* (2013.01); *G06K 9/4652* (2013.01); *G06T 7/11* (2017.01); *G06T 7/174* (2017.01); *G06T 7/194* (2017.01); *H04N 9/75* (2013.01); *G06T 2207/10048* (2013.01); *G06T 2207/10152* (2013.01)

(58) Field of Classification Search
    CPC .... G06K 9/00268; G06K 9/38; G06K 9/2018; G06K 9/2027; G06K 9/4652; H04N 9/75

USPC ................................................. 382/118, 190
See application file for complete search history.

(56) References Cited

U.S. PATENT DOCUMENTS

2012/0262553 A1   10/2012   Chen et al.
2016/0269714 A1    9/2016   Rhemann et al.
2017/0064219 A1    3/2017   Lin et al.

OTHER PUBLICATIONS

James W. Davis, et al., "Background-subtraction using contour-based fusion of thermal and visible imagery", Computer Vision and Image Understanding, ScienceDirect, Jan. 25, 2007, p. 162-182, www.sciencedirect.com.

* cited by examiner

IMAGE PROCESSING METHOD AND ELECTRONIC APPARATUS FOR FOREGROUND IMAGE EXTRACTION

BACKGROUND

1. Technical Field

The present disclosure relates to an image processing method and an electronic apparatus, and in particular, to an image processing method and an electronic apparatus for foreground image extraction.

2. Description of Related Art

In the image synthesis technology, foreground image extraction can roughly be divided into three categories, being the Chroma key technology, the background subtraction method, and the feature detection method.

The concept of the Chroma key technology is to change the background into a single color and remove the background by the color difference between the foreground and the background for cutting out the foreground. However, the Chroma key technology requires that users set up a single color curtain, which is very inconvenient for users.

The concept of the background subtraction method is that when there is a large difference between the foreground pixel value and the background pixel value, the foreground image can be cut out by extraction. However, the background image is easily interfered with by noise, so that the extracted foreground image often contains part of the background image.

The feature detection method performs foreground image extraction for a specific object. Taking an image of the human face as an example, the facial feature detection is performed first, and then the contours are determined based on facial features to extract the image of the human face. However, facial feature detection is easily affected by ambient light, sometimes to a point where the human face cannot be detected. In addition, advanced facial feature detection usually involve complex calculations, so that real-time processing is difficult.

Therefore, if the impact of ambient light, background noise and computation amount can be reduced in the process of foreground image extraction, a better foreground image can be extracted.

SUMMARY

Accordingly, exemplary embodiments of the present disclosure provide an image processing method and an electronic apparatus for foreground image extraction, and which use infrared (IR) technology to perform the foreground image extraction to reduce the impact of ambient light and background noise. More specifically, the image processing method and the electronic apparatus extract a plurality of IR images in different IR strengths and calculate the relationship among the IR images to extract a better foreground image by a simple algorithm, thereby reducing the computation amount to achieve real-time processing.

An exemplary embodiment of the present disclosure provides an image processing method for foreground image extraction. The image processing method is adapted for an electronic apparatus. The image processing method includes the following steps: (A) controlling an IR emitter to operate from a dark state to a light state and then returning to the dark state; (B) acquiring a plurality of frame images of a dynamic image, wherein each frame image has an RGB image and an IR image, and the frame images are generated in the process of the IR emitter operating from the dark state to the light state and then returning to the dark state; (C) acquiring one of the RGB images representing the dark state as an RGB capture image, acquiring one of the IR images representing the light state as an IR light frame image, and acquiring one of the IR images representing the dark state as an IR dark frame image; (D) calculating a difference image between the IR light frame image and the IR dark frame image and binarizing the difference image according to a threshold value to generate a binarized image, wherein the binarized image has an IR foreground part and an IR background part; and (E) acquiring a plurality of foreground pixels of the RGB capture image corresponding to the IR foreground part and taking the foreground pixels as a foreground image of an output image.

An exemplary embodiment of the present disclosure provides an electronic apparatus for foreground image extraction. The electronic apparatus includes an IR emitter, an image capture device, and an image processor. The IR emitter is configured for emitting an IR signal. The image capture device is configured for receiving an IR reflection signal correlated to the IR signal and receiving a visible light single. The image processor is coupled to the IR emitter and the image capture device and executes the following steps: (A) controlling the IR emitter to operate from a dark state to a light state and then returning to the dark state, and generating a dynamic image according to the IR reflection signal and the visible light signal; (B) acquiring a plurality of frame images of the dynamic image, wherein each frame image has an RGB image and an IR image, and the frame images are generated in a process of the image processor controlling the IR emitter operating from the dark state to the light state and then returning to the dark state; (C) acquiring one of the RGB images representing the dark state as a RGB capture image, acquiring one of the IR images representing the light state as an IR light frame image, and acquiring one of the IR images representing the dark state as an IR dark frame image; (D) calculating a difference image between the IR light frame image and the IR dark frame image and binarizing the difference image according to a threshold value to generate a binarized image, wherein the binarized image has an IR foreground part and an IR background part; and (E) acquiring a plurality of foreground pixels of the RGB capture image corresponding to the IR foreground part and taking the foreground pixels as a foreground image of an output image.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

The present disclosure provides an image processing method and an electronic apparatus for foreground image extraction, which control an IR emitter to operate from a dark state to a light state, and then from the light state to the dark state. In the aforementioned process, the image processing method and the electronic apparatus extract a plurality of IR images in different IR strengths to generate an IR image representing the light state as an IR light frame image and an IR image representing the dark state as an IR dark frame image. Then, a binarized image with an IR foreground part and an IR background part is generated according to the IR light frame image and the IR dark frame image. Finally, a plurality of foreground pixels of an RGB capture image corresponding to the IR foreground part is acquired and taken as a foreground image of an output image. Accordingly, the image processing method and the electronic apparatus can reduce the ambient light, the background noise and the computation amount to acquire a better foreground image. The image processing method and the electronic apparatus provided in the exemplary embodiment of the present disclosure will be described in the following paragraphs.

Figure 1:
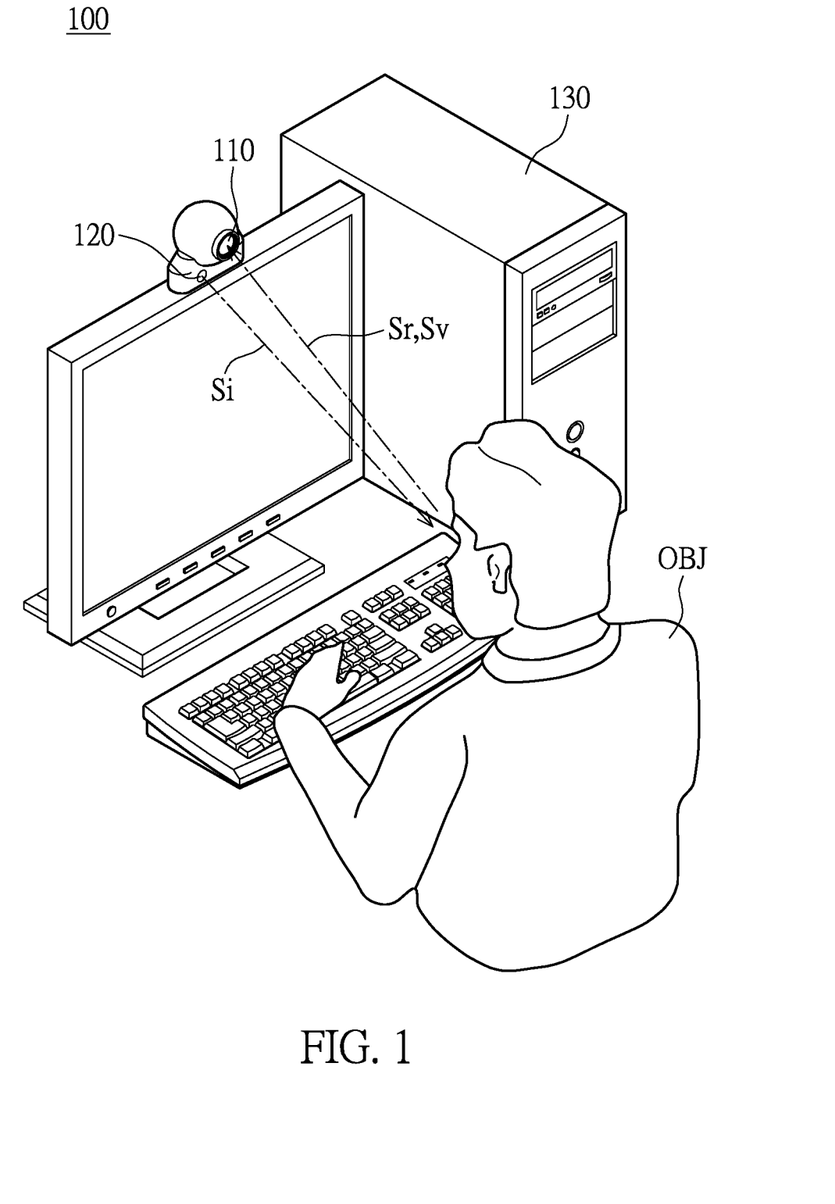
FIG. 1 is a diagram illustrating the positional relationship of an electronic apparatus and a target object according to an embodiment of the present disclosure.
Figure 2:
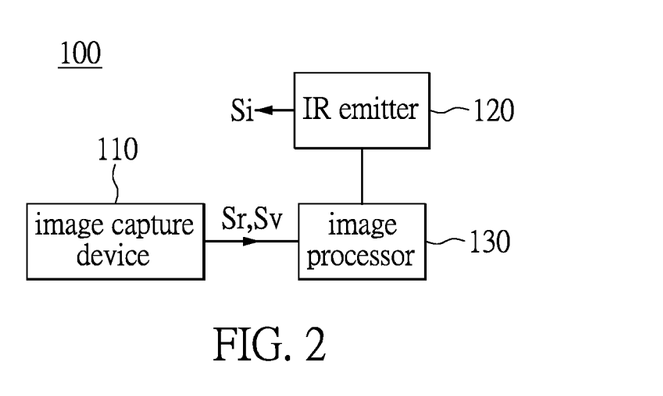
FIG. 2 shows a diagram of an electronic apparatus for foreground image extraction according to an embodiment of the present disclosure.

Reference is first made to FIGS. 1-2. FIG. 1 is a diagram illustrating the positional relationship of an electronic apparatus and a target object according to an embodiment of the present disclosure, and FIG. 2 shows a diagram of an electronic apparatus for foreground image extraction according to an embodiment of the present disclosure. As shown in FIGS. 1-2, the electronic apparatus 100 is disposed near a target object OBJ. The electronic apparatus 100 is used for capturing a dynamic image having the target object OBJ and acquires a foreground image having the target object OBJ from the dynamic image. The electronic apparatus 100 has an IR emitter 120, an image capture device 110, and an image processor 130. The image processor 130 is coupled to the image capture device 110 and the IR emitter 120. In the present disclosure, the electronic apparatus 100 can be a smart phone, a surveillance camera, a tablet computer, a notebook computer, or other electronic devices capable of capturing the IR image and the RGB image simultaneously. However, the present disclosure is not limited thereto.

As shown in FIG. 1, the IR emitter emits an IR signal Si to the target object OBJ and the target object OBJ will reflect an IR reflection signal Sr. At this time, the image capture device 110 receives the IR reflection signal Sr reflected from the target object OBJ and a visible light signal Sv generated by an ambient light. More specifically, the IR emitter 120 is composed of one or more IR LEDs and is disposed near the image capture device 110. In the present disclosure, the IR emitter 120 is composed of one IR LED and is configured under the image capture device 110. The image capture device 110 is an RGB-IR sensor, so that the image capture device 110 can receive the IR reflection signal Sr and the visible light signal Sv simultaneously. Naturally, the image capture device 110 can also be composed of an individual RGB sensor and an individual IR sensor. However, the present disclosure is not limited thereto.

The image processor 130 will control the IR emitter 120 to operate from a dark state to a light state and then return to the dark state. In these states, the image processor 130 receives the reflection signal Sr and the visible light signal Sv and generates a dynamic image according to the IR reflection signal Sr and the visible light signal Sv. Then, the image processor 130 executes the following steps to extract the foreground image with the target object OBJ from the dynamic image.

Figure 3:
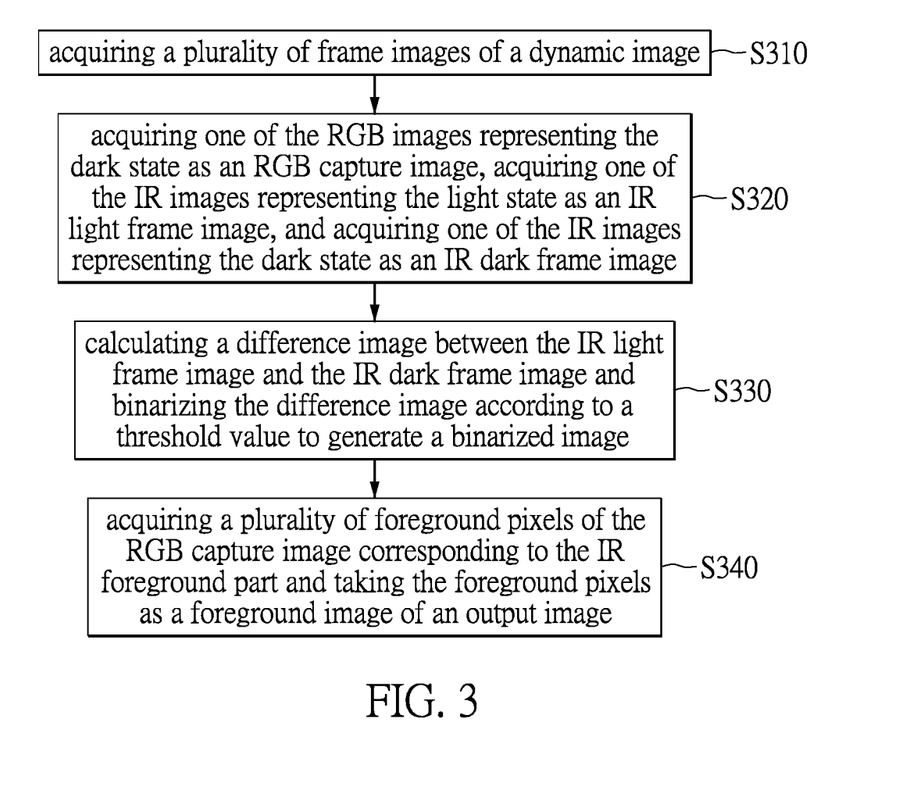
FIG. 3 shows a flowchart of an image processing method for foreground image extraction according to an embodiment of the present disclosure.

Referring to FIG. 3, a flowchart of an image processing method for foreground image extraction according to an embodiment of the present disclosure is shown. Firstly, the image processor 130 of the electronic apparatus 100 acquires a plurality of frame images of the dynamic image (the step S310). Since the dynamic image is generated by the reflection signal Sr and the visible light signal Sv, each of the frame images has an RGB image and an IR image.

It is worth noting that these frame images are generated by the image processor 130 controlling the IR emitter 120 to operate from the dark state to the light state and then from the light state to the dark state. In the present disclosure, the image processor 130 acquires the frame images of the dynamic image by a rolling shutter mechanism or a global shutter mechanism. Since the method of the image processor 130 acquiring the frame images by the rolling shutter mechanism or the global shutter mechanism are well known in the art, detailed descriptions thereof are omitted herein.

Since the rolling shutter mechanism sequentially scans some pixels of a frame image and then combines all pixels into a whole frame image, pixels in the image will not be acquired at the same time. This causes the exposure degree of pixels of one frame image acquired by the IR emitter 120 to be inconsistent during the conversion process of the IR emitter 120 operating between the dark state and the light, so that the frame image cannot be provided to the image processor 130 for analysis. Therefore, in the rolling shutter mechanism, when the exposure degree of all pixels of one frame image acquired by the image processor 130 are the same (i.e., corresponding to the same brightness of the IR light source), the image processor 130 analyzes the frame image. Reference is next made to FIGS. 4A-4D, showing a diagram of an image processor acquiring four frame images by the rolling shutter mechanism according to an embodiment of the present disclosure.

Figure 4A:
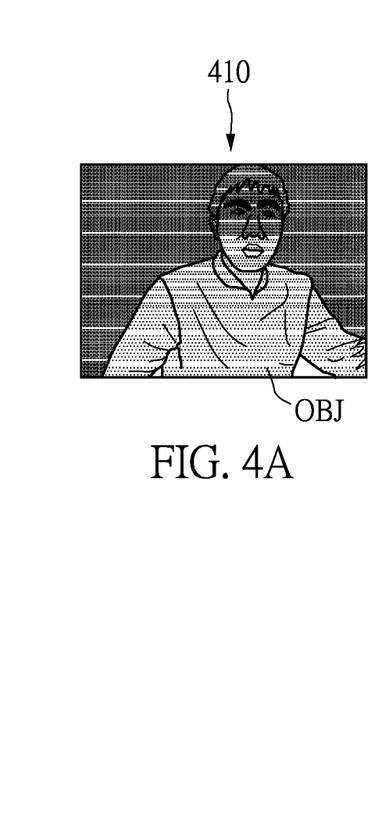
FIGS. 4A-4D show diagrams of an image processor acquiring four frame images by a rolling shutter mechanism according to an embodiment of the present disclosure.
Figure 4B:
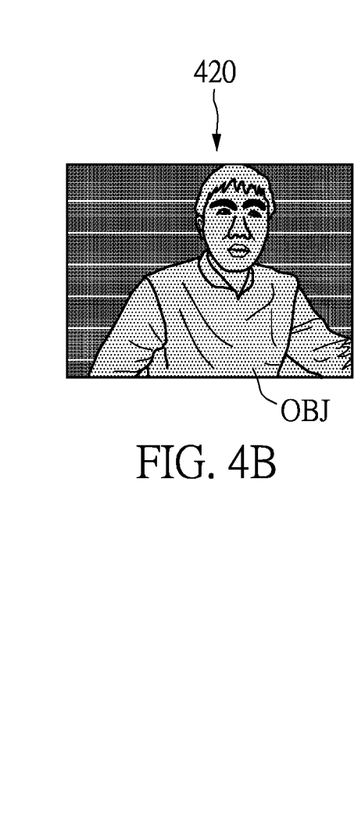

As shown in FIG. 4A, when the image processor 130 controls the IR emitter 120 to operate from the dark state to the light state, the image processor 130 acquires a first frame image 410. At this time, the IR light source is in the process from dark to light. Therefore, under the rolling shutter mechanism, the exposure degree of the target object OBJ in the first frame image 410 would be inconsistent so that the image processor 130 cannot analyze the first frame image 410. As shown in FIG. 4B, the image processor 130 controls the IR emitter 120 operating in the light state for a period of time and then acquires a second frame image 420. At this time, the IR light source is fully lit, so that the exposure degree of the target object OBJ in the second frame image 420 is consistent. The second frame image 420 represents a frame image in the light state, and the image processor 130 then analyzes the frame image.

Figure 4C:
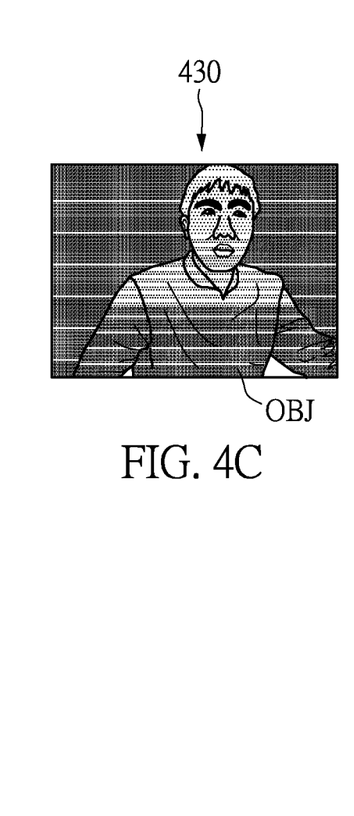
Figure 4D:
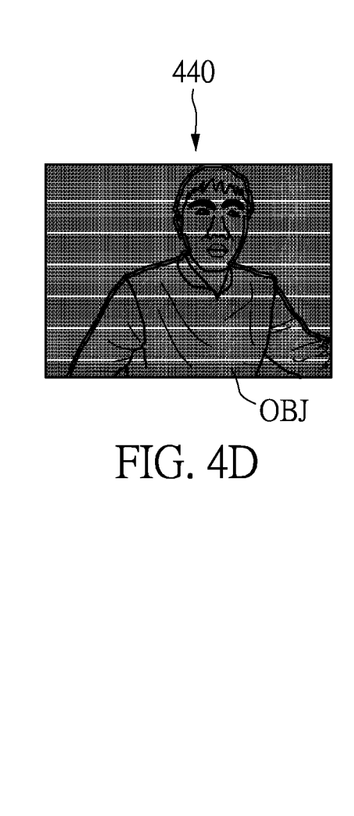

Similarly, as shown in FIG. 4C, when the image processor 130 controls the IR emitter 120 to operate from the light state to the dark state, the image processor 130 acquires a third frame image 430. At this time, the process of the IR light source is from light to dark. Therefore, under the rolling shutter mechanism, the exposure degree of the target object OBJ in the third frame image 430 would be inconsistent, so that the image processor 130 cannot analyze the third frame image 430. As shown in FIG. 4D, the image processor 130 controls the IR emitter 120 to operate in the dark state for a period of time and then acquires a fourth frame image 440. At this time, the IR light source is completely dark, so that the exposure degree of the target object OBJ in the fourth frame image 440 is consistent. The fourth frame image 440 represents a frame image in the dark state, and the image processor 130 then analyzes the frame image.

Figure 5A:
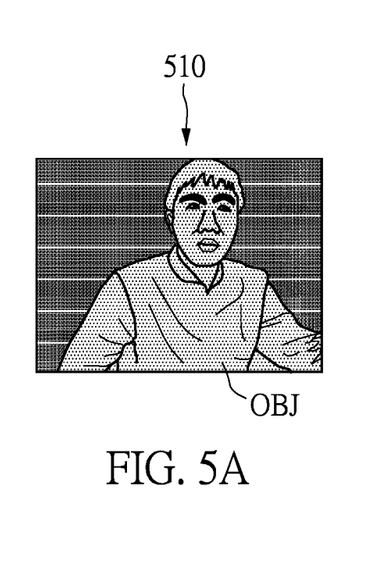
FIGS. 5A-5B show diagrams of an image processor acquiring two frame images by a global shutter mechanism according to an embodiment of the present disclosure.
Figure 5B:
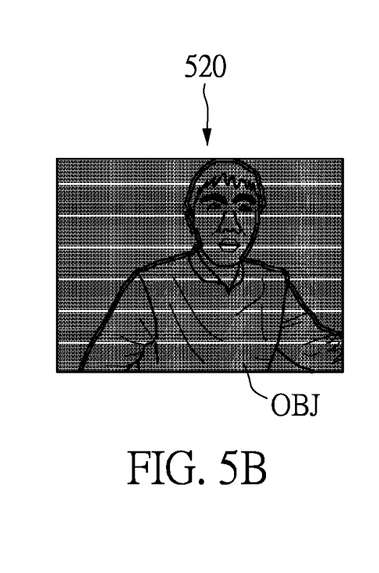

When the global shutter mechanism is used to acquire the frame images of the dynamic image, the global shutter mechanism will acquire all pixels of one frame image simultaneously. This will not cause the exposure degree of same frame image to be inconsistent. Therefore, the image processor 130 directly acquires two frame images in the dynamic image by the global shutter mechanism and then analyzes these frame images. As shown in FIGS. 5A-5B, a diagram of an image processor acquiring two frame images by the global shutter mechanism according to an embodiment of the present disclosure is shown.

As shown in FIG. 5A, the image processor 130 controls the IR emitter 120 to operate in the light state, and the image processor 130 acquires a first frame image 510. The exposure degree of the target object OBJ in the first frame image 510 is consistent, and the first frame image 510 represents a frame image in the light state. As shown in FIG. 5B, the image processor 130 controls the IR emitter 120 to operate in the dark state, and the image processor 130 acquires a second frame image 520. The exposure degree of the target object OBJ in the second frame image 520 is consistent, and the second frame image 520 represents a frame image in the dark state.

It is worth noting that in these acquired frame images, each frame image has the RGB pixels and the IR pixels. Therefore, each frame image has an RGB image and an IR image. Since RGB images are susceptible to pollution by the IR light, the RGB image to be analyzed should not be irradiated by the IR light source. Thus, after the step S310, the image processor 130 acquires one of the RGB images representing the dark state (not irradiated by the IR light source) from these frame images. Then, the image processor 130 takes the one of the RGB images as an RGB capture image 710. In addition, the image processor 130 acquires one of the IR images representing the light state as an IR light frame image 610, and acquires one of the IR images representing the dark state as an IR dark frame image 620 (the step S320).

The following description is based on the example that the image processor 130 acquires four frame images shown in FIGS. 4A-4D. The image processor 130 acquires the RGB image of the fourth frame image 440 as the RGB capture image 710, acquires the IR image of the second frame image 420 as the IR light frame image 610, and acquires the IR image of the fourth frame image 440 as the IR dark frame image 620.

The following description is based on the example that the image processor 130 acquires two frame images shown in FIGS. 5A-5B. The image processor 130 acquires the RGB image of the second frame image 520 as the RGB capture image 710, acquires the IR image of the first frame image 510 as the IR light frame image 610, and acquires the IR image of the second frame image 520 as the IR dark frame image 620.

Figure 6:
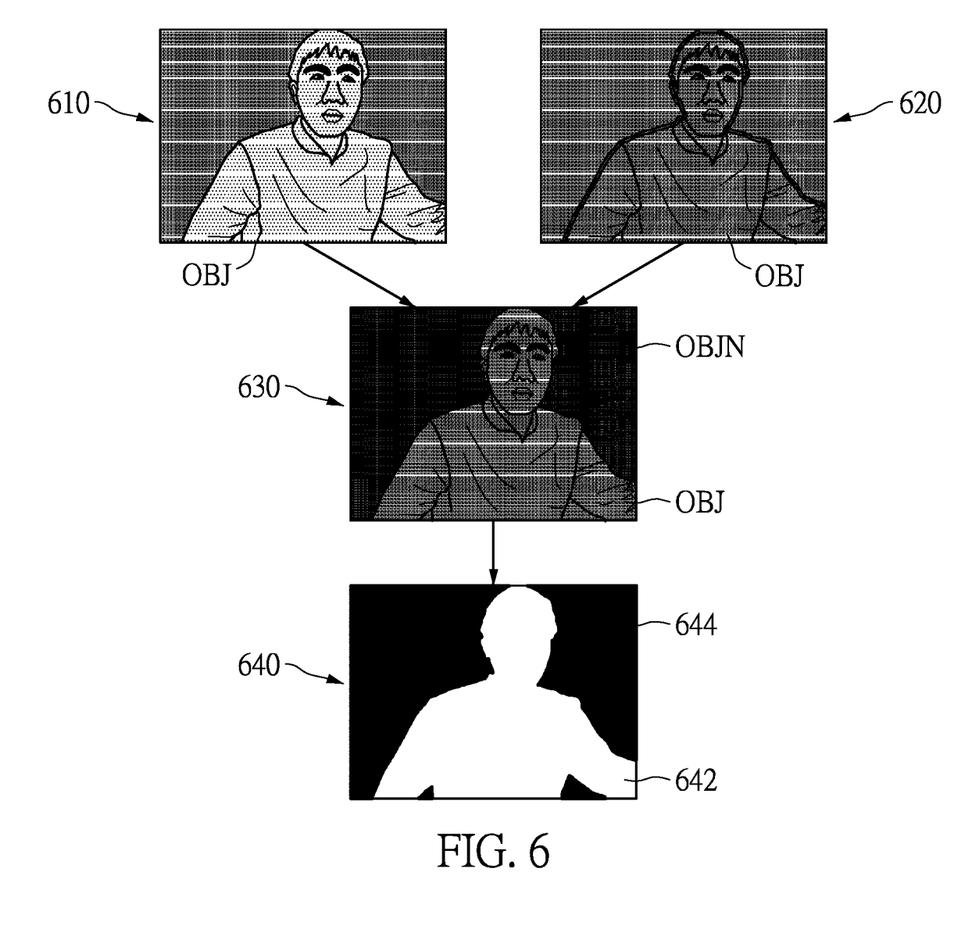
FIG. 6 is a diagram illustrating the calculation of a binarized image according to an embodiment of the present disclosure.

Referring to FIG. 6, after the RGB capture image 710, the IR light frame image 610, and the IR dark frame image 620 are acquired (i.e., the step S320), the image processor 130 calculates a difference image 630 between the IR light frame image 610 and the IR dark frame image 620. The image processor 130 binarizes the difference image 630 to generate a binarized image 640 according to a threshold value, thereby separating the target object OBJ (the foreground) and the non-target object OBJN (the background) in the difference image 630. At this time, the binarized image 640 has an IR foreground part 642 and an IR background part 644.

More specifically, the image processor 130 first sequentially acquires pixel values of a same pixel position in the IR light frame image 610 and the IR dark frame image 620. Next, the image processor 130 sequentially calculates a difference value between the pixel values of the same pixel position to generate the difference image 630. The pixel value of each pixel position in the difference image 630 can be described in the following formula $$IR(i,j)=(IRb(i,j)-IRd(i,j))/2 \qquad (1)$$

In the above formula, $(i,j)$ is the pixel position, $IRb(i,j)$ is the pixel value of one pixel position in the IR light frame image 610, $IRd(i,j)$ is the pixel value of one pixel position in the IR dark frame image 620, and $IR(i,j)$ is the pixel value of one pixel position in the difference image 630. It should be noted that there can be different definitions for the pixel values of the difference image, and the formula (1) is only one of the definitions used for the purpose of this embodiment.

For example, the image processor 130 acquires pixel values of a same pixel position $(i,j)=(10,50)$ in the IR light frame image 610 and the IR dark frame image 620, the pixel values being 50 and 20, respectively. Next, the image processor 130 calculates the pixel value $IR(10,50)$ of the pixel position (10,50) in the difference image 630 by formula (1), i.e., $IR(10,50)=(IRb(10,50)-IRd(10,50))/2=(50-20)/2=15$. For another example, the image processor 130 acquires pixel values of a same pixel position $(i,j)=(100,100)$ in the IR light frame image 610 and the IR dark frame image 620, the pixel values being 150 and 30, respectively. The image processor 130 calculates the pixel value $IR(100,100)$ of the pixel position (100,100) in the difference image 630 by formula (1), i.e., $IR(100,100)=(IRb(100,100)-IRd(100,100))/2=(150-30)/2=60$. The pixel values of other pixel positions in the difference image 630 are calculated by formula (1), thereby generating the difference image 630.

The image processor 130 then determines whether a pixel value of each pixel (hereinafter referred to as "difference pixel") in the difference image 630 is more than or equal to the threshold value. When the pixel value of the difference pixel is more than or equal to the threshold value, the image processor 130 takes the difference pixel as the pixel (hereinafter referred to as "foreground pixel") in the IR foreground part 642. When the pixel value of the difference pixel is less than the threshold value, the image processor 130 takes the difference pixel as the pixel (hereinafter referred to as "background pixel") in the IR background part 644.

In continuation of the example above, the threshold value of the embodiment is set at 25. Therefore, the image processor 130 determines that the pixel value IR(10,50)=15 of the difference pixel is less than the threshold value 25 and takes the difference pixel (10,50) as the background pixel (i.e., the pixel is 0) of the binarized image 640. The image processor 130 determines that the pixel value IR(100, 100)=60 of the difference pixel is more than or equal to the threshold value 25, and takes the difference pixel (100,100) as the foreground pixel (i.e., the pixel is 255) of the binarized image 640.

The calculation of the difference image 630 and the setting of the threshold value may be varied according to practical requirements, and the present disclosure is not limited thereto.

Figure 7:
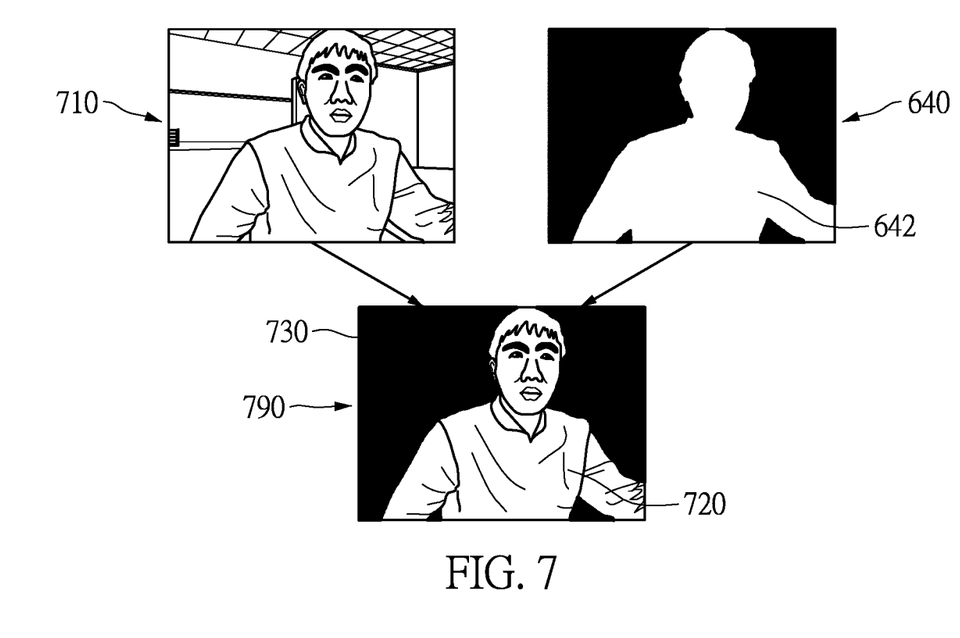
FIG. 7 is diagram illustrating the acquisition of a foreground image according to an embodiment of the present disclosure.

Next, referring to FIG. 7, after acquiring the binarized image 640 (i.e, the step S330), the image processor 130 further acquires a plurality of foreground pixels in the RGB capture image 710 corresponding to the IR foreground part 642 of the binarized image 640, and takes the foreground pixels as a foreground image 720 (taken as an RGB image) of an output image 790. A background image 730 of the output image 790 can be set to black (as shown in FIG. 7), and other images can also be taken as the background image 730 of the output image 790.

In summary, the present disclosure provides the image processing method and the electronic apparatus for foreground image extraction, and which use infrared (IR) technology to perform the foreground image extraction to reduce the impact of ambient light and background noise. More specifically, the image processing method and the electronic apparatus extract the IR images in different IR strengths and calculate the relationship among the IR images to extract a better foreground image by a simple algorithm, thereby reducing the computation amount to achieve real-time processing.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An image processing method for foreground image extraction, adapted for an electronic apparatus, the image processing method comprising:
controlling an IR emitter to operate from a dark state to a light state and then returning to the dark state;
acquiring a plurality of frame images of a dynamic image, wherein each frame image has an RGB image and an IR image, the frame images are generated in the process of the IR emitter operating from the dark state to the light state and then returning to the dark state;
acquiring one of the RGB images representing the dark state as an RGB capture image, acquiring one of the IR images representing the light state as an IR light frame image, and acquiring one of the IR images representing the dark state as an IR dark frame image;
calculating a difference image between the IR light frame image and the IR dark frame image and binarizing the difference image according to a threshold value to generate a binarized image, wherein the binarized image has an IR foreground part and an IR background part; and
acquiring a plurality of foreground pixels of the RGB capture image corresponding to the IR foreground part and taking the foreground pixels as a foreground image of an output image;
wherein the step of calculating the difference image includes:
in the IR light frame image and the IR dark frame image, sequentially acquiring pixel values of a same pixel position; and
sequentially calculating a difference value between the pixel values of the same pixel position to generate the difference image.

2. The image processing method according to claim 1, wherein the step of acquiring the frame images of the dynamic image further includes:
acquiring the frame images of the dynamic image by a rolling shutter mechanism or a global shutter mechanism.

3. The image processing method according to claim 2, wherein the step of acquiring the frame images of the dynamic image by the rolling shutter mechanism further includes:
acquiring four frame images of the dynamic image, wherein a first frame image is acquired in the process of the IR emitter operating from the dark state to the light state, a second frame image is acquired in a process of the IR emitter operating in the light state for a period of time, a third frame image is acquired in the process of the IR emitter operating from the light state to the dark state, and a fourth frame image is acquired in a process of the IR emitter operating in the dark state for a period of time.

4. The image processing method according to claim 3, wherein in the step of acquiring the RGB capture image, the IR light frame image, and the IR dark frame image, further includes:
acquiring the RGB image of the fourth frame image as the RGB capture image, acquiring the IR image of the second frame image as the IR light frame image, and acquiring the IR image of the fourth frame image as the IR dark frame image.

5. The image processing method according to claim 2, wherein in the step of acquiring the frame images of the dynamic image by the global shutter mechanism, further includes:
acquiring two frame images of the dynamic image, wherein a first frame image is acquired in the process of the IR emitter operating in the light state and a second frame image is acquired in the process of the IR emitter operating in the dark state.

6. The image processing method according to claim 5, wherein the step of acquiring the RGB capture image, the IR light frame image, and the IR dark frame image further includes:
acquiring the RGB image of the second frame image as the RGB capture image, acquiring the IR image of the first frame image as the IR light frame image, and acquiring the IR image of the second frame image as the IR dark frame image.

7. The image processing method according to claim 5, wherein before the step of acquiring the frame images of the dynamic image, the method further includes:
emitting an IR signal to a target object, receiving an IR reflection signal reflected by the target object, and receiving a visible light signal; and
generating the dynamic image according to the IR reflection signal and the visible light signal.

8. The image processing method according to claim 1, wherein the step of calculating the difference image further includes:
determining whether a pixel value of each difference pixel of the difference image is more than or equal to the threshold value;
when the pixel value of the difference pixel is more than or equal to the threshold value, taking the difference pixel as the foreground pixel of the IR foreground part; and
when the pixel value of the difference pixel is less than the threshold value, taking the difference pixel as a background pixel of the IR background part.

9. An electronic apparatus for foreground image extraction, comprising:
an IR emitter for emitting an IR signal;
an image capture device for receiving an IR reflection signal correlated to the IR signal and receiving a visible light single; and
an image processor coupled to the IR emitter and the image capture device and executing the following steps:
controlling the IR emitter to operate from a dark state to a light state and then returning to the dark state and generating a dynamic image according to the IR reflection signal and the visible light signal;
acquiring a plurality of frame images of the dynamic image, wherein each frame image has an RGB image and an IR image, the frame images are generated in the process of the image processor controlling the IR emitter to operate from the dark state to the light state and then returning to the dark state;
acquiring one of the RGB images representing the dark state as an RGB capture image, acquiring one of the IR images representing the light state as an IR light frame image, and acquiring one of the IR images representing the dark state as an IR dark frame image;
calculating a difference image between the IR light frame image and the IR dark frame image and binarizing the difference image according to a threshold value to generate a binarized image, wherein the binarized image has an IR foreground part and an IR background part; and
acquiring a plurality of foreground pixels of the RGB capture image corresponding to the IR foreground part and taking the foreground pixels as a foreground image of an output image;
wherein when the image processor calculates the difference image, the image processor sequentially acquires pixel values of a same pixel position in the IR light frame image and the IR dark frame image, and sequentially calculates a difference value between the pixel values of the same pixel position to generate the difference image.

10. The electronic apparatus according to claim 9, wherein when the image processor acquires the frame images of the dynamic image, the image processor acquires the frame images of the dynamic image by a rolling shutter mechanism or a global shutter mechanism.

11. The electronic apparatus according to claim 10, wherein the image processor acquires four frame images of the dynamic image by the rolling shutter mechanism;
wherein when the image processor controls the IR emitter to operate from the dark state to the light state, the image processor acquires a first frame image;
wherein when the image processor controls the IR emitter to operate in the light state for a period of time, the image processor acquires a second frame image;
wherein when the image processor controls the IR emitter to operate from the light state to the dark state, the image processor acquires a third frame image; and
wherein when the image processor controls the IR emitter to operate in the dark state for a period of time, the image processor acquires a fourth frame image.

12. The electronic apparatus according to claim 11, wherein the image processor acquires the RGB image of the fourth frame image as the RGB capture image, acquires the IR image of the second frame image as the IR light frame image, and acquires the IR image of the fourth frame image as the IR dark frame image.

13. The electronic apparatus according to claim 10, wherein the image processor acquires two frame images of the dynamic image by the global shutter mechanism;
wherein when the image processor controls the IR emitter to operate in the light state, the image processor acquires a first frame image; and
wherein when the image processor controls the IR emitter to operate in the dark state, the image processor acquires a second frame image.

14. The electronic apparatus according to claim 13, wherein the image processor acquires the RGB image of the second frame image as the RGB capture image, acquires the IR image of the first frame image as the IR light frame image, and acquires the IR image of the second frame image as the IR dark frame image.

15. The electronic apparatus according to claim 9, wherein when the image processor calculates the difference image, the image processor determines whether a pixel value of each difference pixel of the difference pixel is more than or equal to the threshold value;
wherein when the pixel value of the difference pixel is more than or equal to the threshold value, the image processor takes the difference pixel as the foreground pixel of the IR foreground part; and
wherein when the pixel value of the difference pixel is less than the threshold value, the image processor takes the difference pixel as a background pixel of the IR background part.

16. The electronic apparatus according to claim 9, wherein the IR emitter is disposed near the image capture device.

17. The electronic apparatus according to claim 9, wherein the image capture device is an RGB-IR sensor.

* * * * *